US012223502B2

United States Patent
Royyuru et al.

(10) Patent No.: US 12,223,502 B2
(45) Date of Patent: Feb. 11, 2025

(54) INSTANT DIGITAL ISSUANCE

(71) Applicant: First Data Corporation, Coral Springs, FL (US)

(72) Inventors: Vijay Royyuru, Norristown, PA (US); Benjamin Rewis, Sr., Oakland, CA (US); Lanny Byers, Ridgfield, CT (US); Renee Goodheart, Midland Park, NJ (US); Cindy White, Hockessin, DE (US); Kelly Urban, Omaha, NE (US); Skyler Fox, Park Ridge, NJ (US)

(73) Assignee: FIRST DATA CORPORATION, Milwaukee, WI (US)

( * ) Notice: Subject to any disclaimer, the term of this patent is extended or adjusted under 35 U.S.C. 154(b) by 0 days.

(21) Appl. No.: 16/443,169

(22) Filed: Jun. 17, 2019

(65) Prior Publication Data
US 2019/0385164 A1    Dec. 19, 2019

Related U.S. Application Data

(60) Provisional application No. 62/686,369, filed on Jun. 18, 2018.

(51) Int. Cl.
*G06Q 20/40* (2012.01)

(52) U.S. Cl.
CPC ....... *G06Q 20/401* (2013.01); *G06Q 2220/00* (2013.01); *H04L 2209/56* (2013.01)

(58) Field of Classification Search
CPC .... G06Q 20/401; G06Q 20/36; G06Q 20/027; G06Q 20/3674; G06Q 20/3672;
(Continued)

(56) References Cited

U.S. PATENT DOCUMENTS

| 5,883,810 A | 3/1999 | Franklin et al. |
| 6,456,984 B1 | 9/2002 | Demoff et al. |

(Continued)

FOREIGN PATENT DOCUMENTS

| EP | 3292499 A1 * | 3/2018 | ............ H04W 12/08 |
| EP | 3292499 B1 * | 6/2020 | ............. G06Q 20/40 |

(Continued)

OTHER PUBLICATIONS

International Search Report and Written Opinion mailed Sep. 10, 2019 in related foreign application No. PCT/US2019/037654, 7 pgs.
(Continued)

*Primary Examiner* — Courtney P Jones
(74) *Attorney, Agent, or Firm* — FOLEY & LARDNER LLP

(57) ABSTRACT

Described herein are techniques for facilitating push provisioning of a user payment source into a user's digital wallet without the user having a physical card. The techniques allow an issuer to provide a button in an issuer's mobile application for the user to simply push the button to request that the payment source be imported into the user's digital pay wallet. In this way, the payment source information is "pushed" into the pay wallet. Using push provisioning, the user need not enter any physical card information. The described techniques generate a chain of trust that can be used to ensure that a user, through an issuer and using an encryption gateway, authorizes a token service provider to provision the payment source into the user's digital wallet.

21 Claims, 5 Drawing Sheets

(58) Field of Classification Search
CPC ....... H04L 9/30; H04L 9/3247; H04L 9/3212; H04L 9/3273
See application file for complete search history.

(56) References Cited

U.S. PATENT DOCUMENTS

| | | | |
|---|---|---|---|
| 10,146,803 | B2 | 12/2018 | Kilby et al. |
| 10,460,312 | B1 | 10/2019 | Kurani et al. |
| 10,467,622 | B1 | 11/2019 | Rule et al. |
| 2005/0173520 | A1 | 8/2005 | Jaros et al. |
| 2008/0052225 | A1 | 2/2008 | Walker et al. |
| 2009/0259560 | A1 | 10/2009 | Bachenheimer |
| 2010/0123003 | A1 | 5/2010 | Olsen et al. |
| 2013/0144776 | A1 | 6/2013 | Webster et al. |
| 2013/0151400 | A1* | 6/2013 | Makhotin .......... G06Q 20/3263 705/39 |
| 2014/0316826 | A1 | 10/2014 | Nicoara et al. |
| 2014/0344153 | A1 | 11/2014 | Raj et al. |
| 2015/0032625 | A1 | 1/2015 | Dill et al. |
| 2015/0046338 | A1 | 2/2015 | Laxminarayanan et al. |
| 2015/0073996 | A1* | 3/2015 | Makhotin ........... G06Q 20/354 705/71 |
| 2015/0088756 | A1* | 3/2015 | Makhotin ............ G06Q 20/32 705/71 |
| 2015/0140982 | A1 | 5/2015 | Postrel |
| 2015/0269566 | A1* | 9/2015 | Gaddam ............ G06Q 20/385 705/67 |
| 2015/0327072 | A1* | 11/2015 | Powell .................. H04L 63/10 455/411 |
| 2015/0332262 | A1* | 11/2015 | Lingappa ........... G06Q 20/3823 705/71 |
| 2015/0356560 | A1 | 12/2015 | Shastry et al. |
| 2016/0036790 | A1* | 2/2016 | Shastry ............... G06Q 20/385 713/168 |
| 2016/0071094 | A1 | 3/2016 | Krishnaiah et al. |
| 2016/0078434 | A1* | 3/2016 | Huxham ............. G06Q 20/382 705/71 |
| 2016/0094991 | A1* | 3/2016 | Powell ................. H04W 12/37 455/411 |
| 2016/0119296 | A1* | 4/2016 | Laxminarayanan .. H04L 9/0822 713/168 |
| 2016/0140545 | A1* | 5/2016 | Flurscheim ......... H04L 63/0838 705/76 |
| 2016/0173483 | A1* | 6/2016 | Wong ................... H04W 12/06 726/9 |
| 2016/0260096 | A1* | 9/2016 | Lacoss-Arnold .......................... G06Q 20/38215 |
| 2016/0267445 | A1 | 9/2016 | Nano |
| 2016/0267455 | A1 | 9/2016 | Rewis et al. |
| 2016/0292673 | A1* | 10/2016 | Chandrasekaran .......................... G06Q 20/3674 |
| 2016/0321652 | A1 | 11/2016 | Dimmick et al. |
| 2016/0328707 | A1* | 11/2016 | Wagner ............... G06Q 20/322 |
| 2016/0364721 | A1* | 12/2016 | Deliwala ............... G06Q 20/36 |
| 2017/0032362 | A1 | 2/2017 | Lahkar et al. |
| 2017/0200165 | A1 | 7/2017 | Laxminarayanan et al. |
| 2018/0068297 | A1 | 3/2018 | Goodman et al. |
| 2018/0253718 | A1 | 9/2018 | Khan et al. |
| 2018/0253727 | A1 | 9/2018 | Ortiz et al. |
| 2018/0276657 | A1 | 9/2018 | Cho et al. |
| 2019/0066095 | A1 | 2/2019 | Spector et al. |
| 2019/0066096 | A1 | 2/2019 | Wouters et al. |
| 2019/0066102 | A1* | 2/2019 | Powell ................... H04L 63/06 |
| 2019/0108514 | A1* | 4/2019 | Pendse ............... G06Q 20/3672 |
| 2019/0385164 | A1 | 12/2019 | Royyuru et al. |
| 2020/0082371 | A1 | 3/2020 | Laracey |
| 2020/0118205 | A1 | 4/2020 | Bloy et al. |
| 2020/0320516 | A1 | 10/2020 | Royyuru et al. |
| 2021/0117965 | A1 | 4/2021 | Venot et al. |

FOREIGN PATENT DOCUMENTS

| | | |
|---|---|---|
| KR | 101814133 | 1/2018 |
| KR | 101814134 | 1/2018 |
| WO | 2015/107442 A1 | 7/2015 |
| WO | WO-2016/178780 A1 | 11/2016 |
| WO | WO-2017/160877 A1 | 9/2017 |

OTHER PUBLICATIONS

Extended European Search Report dated Jun. 28, 2021, EP Patent Application No. 207828989, 10 pages.
Extended European Search Report dated Nov. 12, 2021, EP Patent Application No. 19823010.4, 9 pages.
International Search Report and Written Opinion dated Jun. 29, 2020, International Application No. PCT/US2020/026352, 10 pages.
International Search Report and Written Opinion dated Feb. 11, 2022, International Patent No. PCT/US2021/033110, 13 pages.
Non-Final Office Action on U.S. Appl. No. 17/100,909 Dtd Feb. 16, 2023.
Office Action and Search Report issued in connection with United Arab Emirates Appl. No. P2001240/2021 dated Sep. 5, 2023.
International Preliminary Report on Patentability issued in connection with PCT Appl. No. PCT/US2021/033110 dated Nov. 21, 2023.
Office Action and Search Report issued in connection with United Arab Emirates Appl. No. P6001807/2020 dated Nov. 27, 2023.
Office Action issued in connection with Colombia Appl. No. NC2023/0015584 dated Nov. 30, 2023.

* cited by examiner

INSTANT DIGITAL ISSUANCE

CROSS-REFERENCES TO RELATED APPLICATIONS

This application is a nonprovisional of and claims the benefit of and priority to U.S. Provisional Patent Application No. 62/686,369, filed Jun. 18, 2018, entitled "INSTANT DIGITAL ISSUANCE," the content of which is herein incorporated by reference in its entirety.

BACKGROUND

Banks and other credit providers often issue cards for fund use to users, making fast payment quick and easy for users through the use of a credit or debit card. In this way, users must have the card physically available at the point of sale. However, to issue a physical card takes time and costs the issuer and/or user money to generate the card due to labor, material, and shipping costs and costs the issuer and/or user time to wait for generation and shipping of the card before the card can be used. With the advent of online sales and secure mobile devices, other strategies are needed and would be beneficial to both users and card issuers to reduce the time and costs associated with the existing physical card payment systems.

SUMMARY

To address the issues associated with provisioning a physical payment source, systems and methods for providing instant digital issuance of a new payment source, such as a credit card, in a mobile or digital wallet of the user, are described herein. The relevant provisioning and encryption necessary to ensure, for the token service provider, the validity of the payment source from the issuer for the user is described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes receiving, at a gateway encryption service of a gateway system, from an issuer mobile application server, user information for a user and account information for a payment source of the user. The gateway encryption service can transmit the user information and the account information to a gateway lookup service of the gateway system. The gateway lookup service can receive, from an issuing host platform, primary account number data for the payment source. The gateway lookup service can transmit the primary account number data to the gateway encryption service. The gateway encryption service can encrypt the primary account number data to generate encrypted provision data. The gateway encryption service can transmit the encrypted provision data to the issuer mobile application server. The issuer mobile application server, having the encrypted provision data, can allow the user to utilize the digital payment source in a digital wallet without the user having the physical payment source. Other embodiments of this aspect include corresponding computer systems, apparatus, and computer programs recorded on one or more computer storage devices, each configured to perform the actions of the methods.

Implementations may include one or more of the following features. Optionally, encrypting the primary account number data includes identifying an encryption key and/or a validation key from multiple encryption and/or validation keys using the primary account number data, and encrypting, using the encryption key, and/or signing, using the validation key, the primary account number data to generate the encrypted provision data. Optionally, the encryption key and/or the validation key identifies a token service provider.

Optionally, encrypting the primary account number data further includes identifying a first set of encryption requirements for the mobile device pay wallet using wallet data from the mobile device pay wallet, and identifying a second set of encryption requirements for the token service provider. In such cases, encrypting the primary account number data using the encryption key includes complying with the first set of encryption requirements and complying with the second set of encryption requirements.

Optionally, the gateway encryption service, may receive the encryption key and/or the validation key and store the encryption key and/or the validation key in a database with other encryption and/or validation keys. In such cases, identifying the encryption key and/or the validation key includes identifying an associated issuer using the primary account number data and searching the database for the encryption key and/or the validation key using the associated issuer.

Optionally, the payment source is a credit card. Optionally, the user information for the user and the account information for the payment source of the user includes a name of the user, a digital wallet data of the user, and an issuer nonce. Optionally, the primary account number data includes a sixteen-digit primary account number of the payment source, an address of the user, and a nickname of the payment source.

Optionally, an issuer mobile application using a software development kit receives a list of accounts for the user, where the payment source is selected from the list of accounts. Optionally, the issuer mobile application using a software development kit receives the encrypted provision data. The software development kit can invoke a request to provision the payment source in the mobile device pay wallet of the user using the encrypted provision data. The software development kit can receive a result of the request to provision the payment source in the mobile device pay wallet. Optionally, receiving the result of the request to provision the payment source in the mobile device pay wallet includes receiving a token for providing the payment source in the mobile device pay wallet.

Optionally, the gateway encryption service receives, from the issuer mobile application server, an issuer nonce indicating that the user was authenticated by the issuer mobile application server. Optionally, encrypting the primary account number data includes encrypting the issuer nonce along with the primary account number data. Optionally, The token service provider receives the encrypted primary account number data along with the issuer nonce. The token service provider may decrypt the encrypted primary account number data and the issuer nonce using an encryption key and validates the signature using a validation key. In response to validating the signature, the token service provider may transmit the issuer nonce to the issuer in a provision request. The issuer may authorize the provision request and log the issuer nonce. Implementations of the described techniques may include hardware, a method or process, or computer software on a computer-accessible medium.

DETAILED DESCRIPTION

Figure 1:
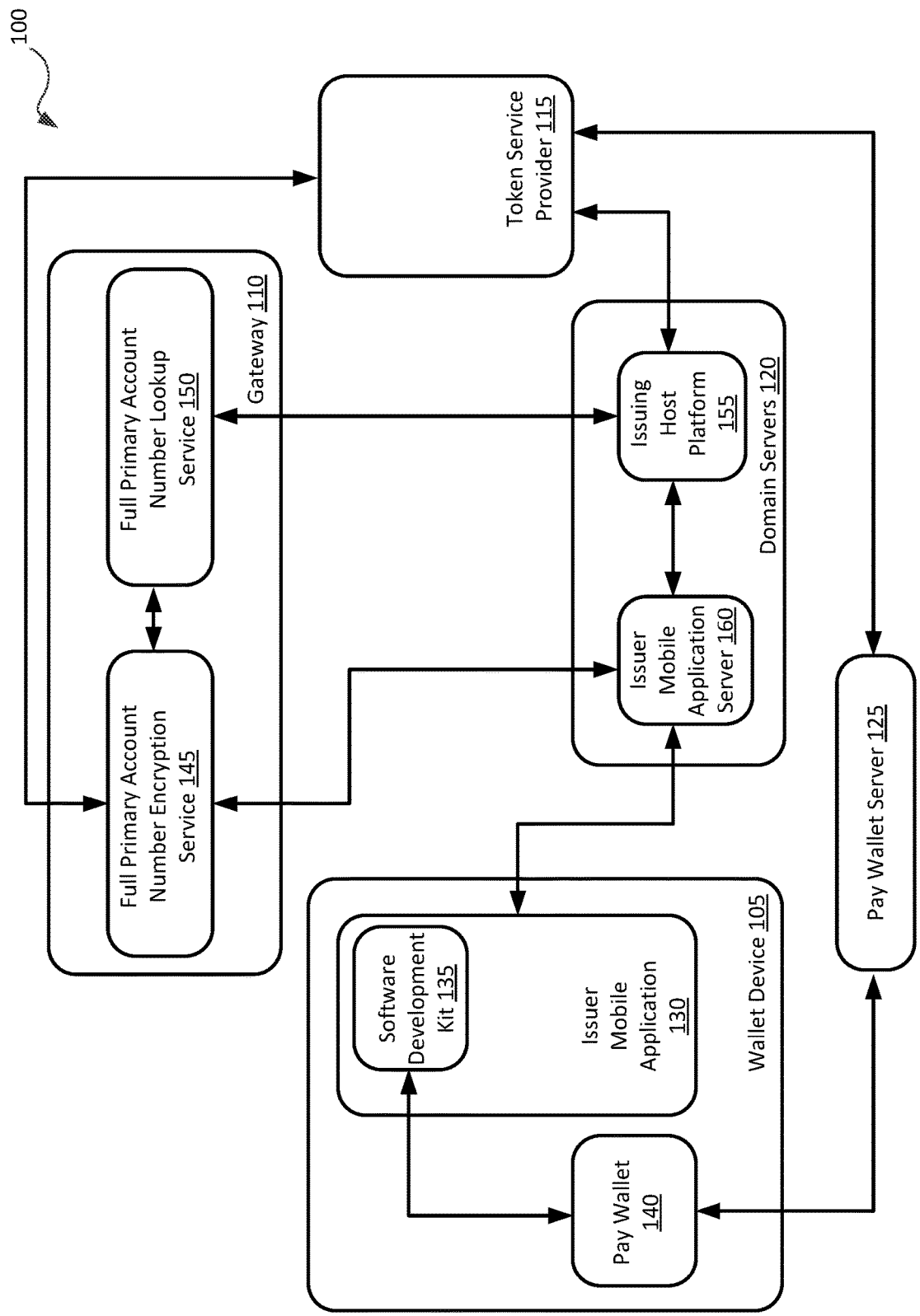
FIG. 1 illustrates a system for instant digital issuance of payment sources

Consumers paying for goods and services often use credit or debit cards as a payment method. However, payment using debit or credit cards for a user typically involves obtaining the account and then waiting for the card to arrive so that it can be used. For the card issuer, typically there are time and money costs involved in generating and shipping the card, which leaves the user unable to use the card to purchase goods and services until the card arrives. Both issuers and users (i.e., consumers) would benefit from the ability of an issuer to instantly issue a digital card to the user on a mobile device.

Many users have secure mobile devices that are personally owned and used. For example, many users have a mobile cellular telephone and/or tablet. A mobile device may include a digital pay wallet. A pay wallet may be software on the mobile device that allows a user to link a payment source (e.g., credit or debit card) to the mobile device so that the payment source can be used to purchase goods and services without having a physical card or check, for example. Often near field communication is used between the point-of-sale device and the mobile device to securely provide the payment information from the mobile device to the point-of-sale device.

In some existing systems, the user of the mobile device typically uses the physical card information to set up the pay wallet with the payment source. For example, a user can use a pay wallet application on their mobile device and either take a picture of the physical card or manually enter the information from the physical card to add the card to their pay wallet in this manner. This type of provisioning of a card into a pay wallet is typically termed pull provisioning. The payment source information is "pulled" into the pay wallet. The user is limited, however, to waiting until the physical card arrives to provision the card into the pay wallet. Entering the physical card information, however, assures the pay wallet provider, the issuer, and the token service provider that the user is the owner of the payment source. As such the user can be authenticated for provisioning the payment source into the pay wallet.

Described herein are methods and systems for facilitating push provisioning, which may allow an issuer to provide a button in an issuer's mobile application for the user to simply push the button to request that the payment source be imported into the user's pay wallet. In this way, the payment source information is "pushed" into the pay wallet. Using push provisioning, the user need not enter any physical card information. However, the user must be authenticated properly to prove to each of the issuer, the pay wallet provider, and the token service provider that the user owns the payment method.

In existing systems, various different pay wallet providers and issuers have differing requirements for provisioning a payment source into a pay wallet. Because of the complications associated with tracking the various requirements of each pay wallet provider, issuers are reluctant to implement push provisioning in their issuer mobile applications. Described herein is a software development kit for including by an issuer in the issuer's mobile application that provides the interfaces for easily implementing push provisioning with any pay wallet provider.

Further, in existing systems, obtaining the primary account number ("PAN") data and appropriately encrypting the information varies by token service provider, making the issuer even more reluctant and sometimes simply unable to implement push provisioning. In addition to the software development kit, the described solution provides a PAN gateway lookup service and a PAN gateway encryption service with which the software development kit can interface for ensuring that the push provisioning works not only with any pay wallet but with any token service provider.

FIG. 1 illustrates a system 100 for instant digital issuance of payment sources. The system 100 can include a wallet device 105, a gateway 110, a token service provider 115, domain servers 120, and a pay wallet server 125.

The wallet device 105 may be any suitable device that can support a digital wallet. The wallet device 105 may be computer system 400 as described with respect to FIG. 4. The wallet device 105 may be, for example, a mobile cellular telephone, a tablet, a personal digital assistant, or the like. The wallet device 105 (also referred to herein as a user device or a mobile device) may include a pay wallet 140 and an issuer mobile application 130. While only a single wallet device 105 is depicted in FIG. 1, any number of wallet devices 105 may be supported within system 100.

The pay wallet 140 may be any suitable digital wallet. The pay wallet 140 may be implemented as a software application installed and executed upon the wallet device 105. Currently digital wallets are available from multiple vendors including, for example, Apple Pay® from Apple Inc., Google Pay™ from Google LLC, and Samsung Pay® from Samsung.

The issuer mobile application 130 may be a software user interface application provided by the card issuer. The card issuer may be any suitable payment source (e.g., debit or credit card) issuer. Example card issuers include, for example, JPMorgan Chase & Co, Wells Fargo, Bank of America Corporation, Capital One, and so forth. Each issuer may provide an issuer mobile application 130. The issuer mobile application 130 may be a software application that is installed on the wallet device 105 and allows the user to access the user's account information with the issuer.

The issuer mobile application 130 may incorporate a software development kit 135. The software development kit 135 may provide interfaces and methods for interfacing with pay wallet 140 and domain servers 120 that facilitate push provisioning of a payment source from the issuer that provides issuer mobile application 130 into the pay wallet 140 for use on the wallet device 105.

The token service provider 115 may provide a token service for digital use of the payment source. For example, when sending digital payment information, the full account information, such as the sixteen digit account number may not be sent to protect the account information. Rather, a token may be generated and assigned to the sixteen digit account number. The token service provider 115 may receive and validate the push provision request with the encrypted provision data and activation data. The token service provider 115 may authorize the token and provide notification of the approval to the pay wallet server 125 as well as the issuing host platform 155. While only one token service provider 115 is depicted in FIG. 1, any number of token service providers 115 may be included in system 100. Token service provider 115 may be, for example First Data universal token service by First Data Corporation or Visa token service by Visa Inc. The token service provider 115 may be a service provided on a computer system (e.g., a server) such as computer system 400 of FIG. 4.

The domain servers 120 may include the issue mobile application server 160 and the issuing host platform 155. The domain servers 120 may be any suitable servers the issuer of the payment source provides and may be computer systems 400 of FIG. 4. The issuer mobile application server 160 may be a server managed by the issuer that the issuer mobile application 130 interfaces with to obtain user account information for display in the user interface of the issuer mobile application 130 on the user's wallet device 105. The issuing host platform 155 may be the host server managed by the issuer that stores and manages all user account information.

Figure 4:
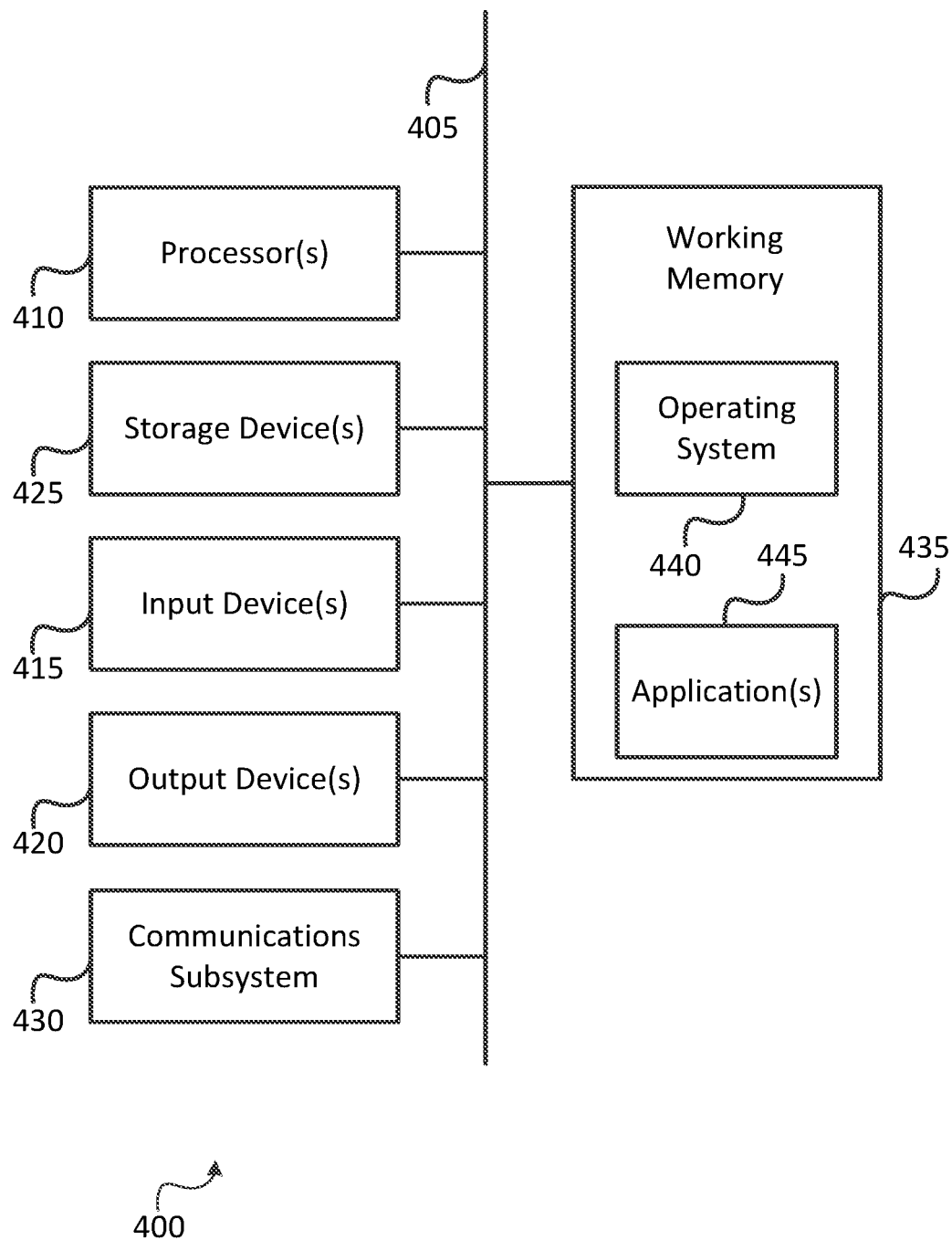
FIG. 4 illustrates an exemplary computer system.

The pay wallet server 125 may be any suitable server provided by the pay wallet provider (e.g., Google LLC for Google Pay, Samsung for Samsung Pay®, and so forth), such as for example computer system 400 of FIG. 4. The pay wallet server 125 may interface between the token service provider 115 and the pay wallet 140 to provision the payment source in the pay wallet 140. While a single pay wallet server 125 is depicted in FIG. 1, any number of pay wallet servers 125 may be included in system 100.

The gateway 110 may include full PAN encryption service 145 and full PAN lookup service 150. The gateway may be one or more servers that are hosted on a network (not shown) for communication with the domain servers 120 and the token service provider 115. The gateway 110 may be computer system 400 of FIG. 4. While a single gateway 110 is shown in FIG. 1, any number of gateways 110 may be included. The full PAN encryption service 145 and the full PAN lookup service 150 provided by gateway 110 provide a many-to-many gateway service for encrypting PAN data. Each pay wallet server 125 has specific encryption requirements that differ. For example, Apple Pay® has different encryption requirements than Samsung Pay®. Further, each token service provider 115 has differing encryption requirements. For example, First Data universal token service has different encryption requirements than Visa token service. The combination of digital wallet (e.g., Apple Pay®, Samsung Pay®, or the like) and token service provider (e.g., Visa token service, First Data universal token service, or the like) each has a unique combination of encryption requirements that complicate push provisioning for an issuer to implement push provisioning in the issuer's mobile application. The gateway 110 with the full PAN encryption service 145 and the full PAN lookup service 150 in combination with the software development kit 135 provide a technical solution that simplifies implementing push provisioning in the issuer's mobile application (issuer mobile application 130).

The full PAN lookup service 150 and the full PAN encryption service 145 may be software services installed upon the gateway 110 for providing their respective services as described in more detail herein.

The full PAN lookup service 150 may provide lookup services of a user's PAN from an issuing host platform 155. The full PAN lookup service 150 may obtain the information for a user account including the full sixteen digit account number, a card nickname, an associated address of the user, credentials (e.g., user name of the user) from the issuer mobile application 130, and so forth. The full PAN lookup service 150 is optional. In some embodiments, the issuer may provide the full sixteen digit account number and all other necessary information such that the full PAN lookup service 150 is not used.

The full PAN encryption service 145 may obtain the user account information from the full PAN lookup service 150 and prepare encrypted provision data used to complete the push provisioning as described in detail herein. The encrypted provision data is encrypted and signed by the full PAN encryption service 145. The encryption is completed using an encryption key provided to the full PAN encryption service 145 by the token service provider 115. Each token service provider 115 provides an encryption key for encryption of user data. In some embodiments. The token service provider 115 provides a single encryption key for all user accounts that use the token service provider 115, and in some embodiments an encryption key unique to each issuer is provided. The encryption ensures that only the destined token service provider 115 or the destined pay wallet server 125 can decrypt the data. The encryption provision data is also signed by the full PAN encryption service 145 using a validation key established by the full PAN encryption service 145 and exchanged with the token service provider 115. The signature ensures the token service provider 115 can validate the signature in the provision request to ensure the chain of trust is complete as described in more detail herein.

Figure 2:
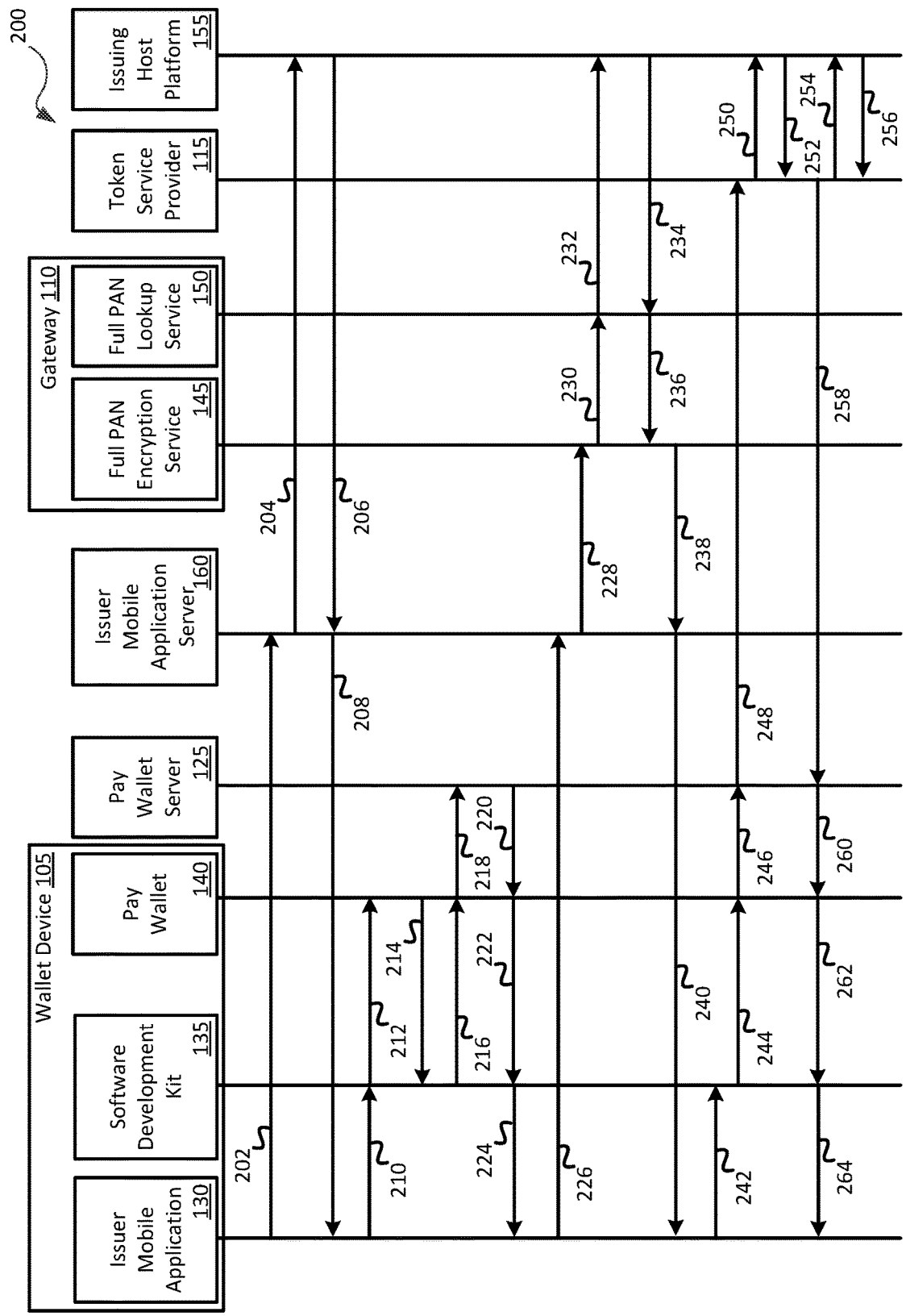
FIG. 2 illustrates a swim diagram for instant digital issuance of payment sources.

FIG. 2 illustrates a swim diagram 200 of a method for instant digital issuance of a payment source using the components described with respect to FIG. 1. Along the top of the swim diagram 200, the components described with respect to FIG. 1 are shown including the wallet device 105, issuer mobile application 130, software development kit 135, pay wallet 140, pay wallet server 125, issuer mobile application server 160, gateway 110, full PAN encryption service 145, full PAN lookup service 150, token service provider 115, and issuing host platform 155.

Beginning with the issuer mobile application 130, as arrow 202, the issuer mobile application 130 transmits user information entered by the user using the user interface of the issuer mobile application 130. The user information is transmitted to the issuer mobile application server 160.

The issuer mobile application server 160 may authenticate the user using the user information (e.g., a user name and password, biometric data, and so forth). The issuer mobile application server 160 may transmit a request, shown by arrow 204, to issuing host platform 155 for a list of eligible accounts for the user. The eligible accounts may include any user accounts the issuer has recorded for the user. For example, a user may have one or more checking or savings accounts associated with one or more debit cards and/or one or more credit cards from the same issuer (e.g., Wells Fargo, Capital One, and so forth).

The issuing host platform 155 may transmit the full PAN suffix data (e.g., the last four digits of the sixteen digit account number) for each eligible account for the user to the issuer mobile application server 160 as shown by arrow 206. The issuer mobile application server 160 may transmit the full PAN suffix data to the issuer mobile application 130 as shown by arrow 208. The issuer mobile application 130 may not maintain account information for the user on the wallet device 105, so all account information may be obtained from the issuer mobile application server 160 for display in the user interface of the issuer mobile application 130.

Once the issuer mobile application 130 has obtained the full PAN suffix data, the issuer mobile application 130 can invoke methods provided by the software development kit 135 as shown by arrow 210. Arrow 212 indicates that the software development kit 135 may include a method to query the pay wallet 140 for whether the full PAN suffix data identifies an account (i.e., payment source) that has previously been provisioned by the pay wallet 140. If the account has previously been provisioned by the pay wallet 140, there is no need to provision the account again. However, if the account has not previously been provisioned by the pay wallet 140, the user may wish to use push provisioning to provision the pay source into the pay wallet 140.

The pay wallet 140 may respond to the query, as shown by arrow 214, with information indicating whether the account associated with the full PAN suffix data for each eligible account has previously been provisioned.

If at least one account has not previously been provisioned, the software development kit 135 may invoke another method to request wallet data for push provisioning. Wallet data may include, for example, a wallet identifier (i.e., an identifier for pay wallet 140), a device identifier (e.g., an Internet Protocol address for wallet device 105, a media access control ("MAC") address for wallet device 105, or any other suitable identifier for wallet device 105), a binding identifier or a digital signature that binds the user to the pay wallet 140, a name of the wallet device 105, the push provision request (used to prevent the request from being replayed or spoofed), a wallet certificate that contains a public key for encrypting PAN data to be sent back to the pay wallet server 125, and the like. For simplicity of explanation, only a single account provision is described, but multiple accounts from an issuer may be provisioned into pay wallet 140 in parallel or serially. The software development kit 135 may request the wallet data from the pay wallet 140 as shown by arrow 216. The pay wallet 140 may request the wallet data from the pay wallet server 125 as shown by arrow 218. The pay wallet server 125 may provide the wallet data for the account to the pay wallet 140 as shown by arrow 220. The pay wallet 140 may provide the wallet data to the software development kit as shown by arrow 222. The software development kit 135 may provide the wallet data to the issuer mobile application 130 as shown by arrow 224. The issuer mobile application 130 may then display a button within the user interface of the issuer mobile application 130. The button, when pressed by the user, may invoke the push provisioning process for adding the account to the pay wallet 140.

Arrow 226 may transmit the wallet data from the issuer mobile application 130 to the issuer mobile application server 160 when the user pushes the button within the issuer mobile application 130 to invoke the push provisioning process for adding the payment source (i.e., eligible account for which the full PAN suffix data was obtained) to the pay wallet 140.

The issuer mobile application server 160 may authenticate the user and confirm the authenticity of the received information. Once authenticated, the issuer mobile application server 160 may provide the account information (e.g., the user name, the full PAN suffix data, and so forth), the wallet data, and an issuer nonce to the Full PAN encryption service 145 as shown by arrow 228. The issuer nonce may be a randomly generated identifier that indicates that the user has been authenticated by the issuer mobile application server 160 (the user was previously authenticated at arrow 202) and is used in the push provision request for the transaction beginning at arrow 228. Optionally, the PAN data including the full sixteen digit account number may have been provided to the full PAN encryption service 145 from the issuer mobile application server 160 as well.

The full PAN encryption service 145 may determine whether a full PAN lookup is needed based on whether the full PAN encryption service 145 has the PAN data. If the full PAN encryption service 145 does not have the PAN data, the full PAN encryption service 145 may transmit the account information, the wallet data, and the issuer nonce to the full PAN lookup service 150 as shown by arrow 230.

The full PAN lookup service 150 may request the PAN data from the issuing host platform 155 as shown by arrow 232. The request may include the user information, account information, and/or credentials obtained from the issuer mobile application server sent through the full PAN encryption service. The issuing host platform 155 may search a database or other data source using the user information, account information, and/or credentials to identify the requested PAN data. The issuing host platform 155 may return the PAN data to the full PAN lookup service 150 as shown by arrow 234. The PAN data may include the full sixteen digit account number, the user's address, and/or the payment source (e.g., credit card) nickname.

As shown by arrow 236, the PAN data may be transmitted from the full PAN lookup service 150 to the full PAN encryption service 145. The full PAN encryption service may encrypt the PAN data to create encrypted provision data. Optionally, the user information, account information, wallet data, issuer nonce, PAN data, user's address, and/or card nickname may be included with the PAN data and encrypted. The full PAN encryption service 145 may encrypt the PAN data (including the user information, account information, wallet data, issuer nonce, PAN data, user's address, and/or card nickname) using an encryption key and may digitally sign the PAN data using a validation key. The encryption key and/or the validation key may be set with the token service provider information. In other words, the encryption key and/or the validation key may identify the token service provider. The encryption key and/or the validation key may be obtained from the issuer when the issuer registers with the gateway 110, which may optionally include registering with the full PAN encryption service 145 and/or the full PAN lookup service 150. Optionally, the encryption key and/or the validation key may be established directly between the full PAN encryption service 114 and the token service provider 115, and all provision requests for issuers that use that token service provider 115 have data that is encrypted with the encryption key and signed with the validation key for that token service provider 115. Optionally, multiple issuers may utilize the same encryption key and/or validation key. When the full PAN encryption service 145 obtains an encryption and/or validation key, the encryption and/or validation key may be stored with other keys in a database or other storage location accessible to the full PAN encryption service 145. The full PAN encryption service 145 may search the key database using, for example, the primary account number data. As an example, the first four digits of a sixteen digit account number may identify an issuer, so the database may be queried using the first four digits of the sixteen digit account number from the PAN data to identify the encryption key and/or validation key. As another example, the issuer may be identified based on the PAN data and the database may be queried using the issuer for the encryption key and/or validation key. Optionally, the PAN data encrypted with the encryption key may also be encrypted with the wallet certificate from the wallet data. The wallet certificate may include a public key used for encrypting the PAN data. The pay wallet server 125 may have the corresponding private key for decryption that the pay wallet server may use to decrypt the PAN data as described below.

In some embodiments, the validation key is unique to the issuer and the token service provider. In other embodiments, the token service provider permits the full PAN encryption gateway to use the same validation key across multiple issuers processed by that gateway because the gateway performs mutual authentication with the issuer server, and the token service provider trusts the gateway's authentication of the issuer server. Using the same validation key across multiple issuers speeds up the implementation timeline for enabling this gateway service for a new issuer. The chain of trust generated by the process is sufficient to ensure security. For example, the chain of trust is that the issuer authorizes the user and sends the request to the encryption gateway. The encryption gateway has mutual authentication of the issuer and signs the request payload with a key trusted by the token service provider. Accordingly, because the request is encrypted with a trusted key by a trusted partner that in turn has authenticated the issuer, and the issuer has in turn authenticated the user, the token service provider can be assured that the user is validly requesting the provisioning of the payment source into the user's digital pay wallet.

As discussed above with respect to gateway 110 of FIG. 1, the token service provider 115 and the pay wallet server 125 may each have different encryption requirements. Further, for any given push provision request, any available digital wallet (i.e., pay wallet server 125) and any available token service provider (i.e., token service provider 115) may be used so that any given push provision request may require any combination of encryption requirements that meet both the selected token service provider encryption requirements and the digital wallet encryption requirements. The full PAN encryption service 145 may identify the set of encryption requirements for the token service provider identified by the encryption key. The full PAN encryption service 145 may also identify the set of encryption requirements for the pay wallet server 125 based on the wallet data included with the PAN data. The encryption requirements for all available token service providers 115 may be stored in a database available to full PAN encryption service 145. The encryption requirements for all available pay wallet servers 125 may also be stored in a database available to full PAN encryption service 145. Full PAN encryption service 145 may identify each set of encryption requirements (i.e., the set of encryption requirements for the token service provider and the set of requirements for the pay wallet server) and ensure the encryption of the PAN data complies with each set of requirements. Example requirements may include the type of encryption algorithm (e.g., symmetric-key algorithm, format-preserving algorithm, and so forth) that may be used, the minimum length of the encryption key (e.g., 128-bit key, 256-bit key, and so forth) that may be used, and so forth.

Once the full PAN encryption service 145 has generated the encrypted provision data, the full PAN encryption service 145 may transmit the encrypted provision data to the issuer mobile application server 160 as shown by arrow 238. The issuer mobile application server 160 may transmit the encrypted provision data to the issuer mobile application 130 as shown by arrow 240. The issuer mobile application 130 may invoke an add card method that may call methods within the software development kit 135 as shown by arrow 242.

The software development kit 135 may initiate a request to add the card to the pay wallet 140 by transmitting the encrypted provision data to the pay wallet 140 as shown by arrow 244. The pay wallet may transmit the provision request to the pay wallet server 125 by transmitting the encrypted provision data as shown by arrow 246. The pay wallet server 125 may transmit the provision request and the encrypted provision data to the token service provider 115 as shown by arrow 248.

The token service provider 115 may use the encryption key to decrypt the encrypted provision data and may use the validation key to authenticate the data as from the encryption gateway. The token service provider 115 may identify within the decrypted provision data the account information including the PAN data (e.g., the sixteen digit account number), the user information, the wallet data, and so forth, and use the identified information to generate a token to be used by the user within the pay wallet 140. The token service provider 115 may transmit a provision authorization, including the token and the issuer nonce, to the issuing host platform 155 as shown by arrow 250.

The issuing host platform 155 may store the token with the PAN data. Optionally, the issuer mobile application 130 may have previously sent the issuer nonce to the issuing host platform 155 (not depicted in FIG. 2). The issuing host platform 155 may check the issuer nonce from the issuer mobile application 130 against the issuer nonce received at 250 to confirm that the push provision request was authenticated by the issuer mobile application server 160, thereby validating the chain-of-trust. The issuing host platform may transmit an acknowledgement to the token service provider 115 as shown by arrow 252. The token service provider may then transmit a provision notification to the issuing host platform 155 as shown by arrow 254, and the issuing host platform 155 may transmit an acknowledgement to the token service provider 115 as shown by arrow 256. After these acknowledgements, the token service provider 115 and the issuing host platform 155 both acknowledge the token and consider the account provisioned into the pay wallet 140.

The token service provider 115 then transmits the provision response (e.g., successful provisioning indicated by the token, which is also transmitted) to the pay wallet server 125 as shown by arrow 258. The pay wallet server 125 then stores the token with the user information and account information so that future requests to determine whether the add button should be included in the issuer mobile application will result in a negative response. Further, the pay wallet 140 will obtain the token from the pay wallet server 125 to allow the user to use the payment source (i.e., account associated with the token) from the pay wallet 140. The pay wallet server 125 transmits the token to the pay wallet 140 as shown by arrow 260. The pay wallet 140 transmits the token and/or a success or failure message indicating whether the payment source was successfully provisioned or not to the software development kit 135 as shown by arrow 262. The software development kit 135 transmits the token and/or the success or failure message to the issuer mobile application 130 as shown by arrow 264. The issuer mobile application 130 then optionally displays a notification to the user that the account was successfully provisioned into the pay wallet 140 or indicates a failure if the provisioning was unsuccessful.

Figure 3:
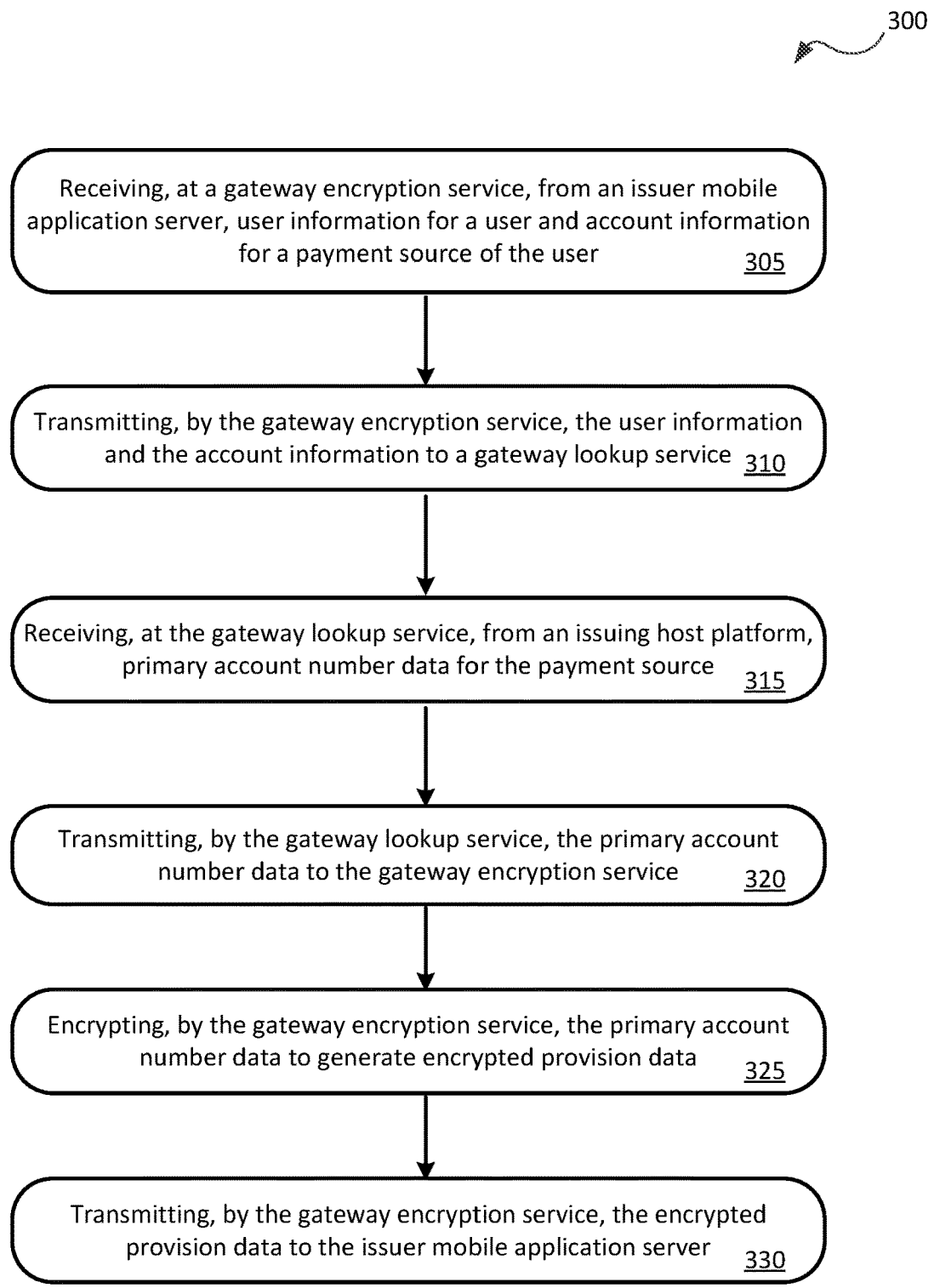
FIG. 3 illustrates a method for instant digital issuance of payment sources.

FIG. 3 illustrates a method 300 for instant digital issuance of a payment source. The method may be performed by the gateway 110 as described with respect to FIG. 1. The method 300 begins at block 305 with the gateway encryption service (e.g., full PAN encryption service 145 of FIG. 1) receiving user information for a user and account information for a payment source of the user from an issuer mobile application server (e.g., issuer mobile application server 160). Optionally, the user information and account information is transmitted to the gateway encryption service in response to a user requesting push provisioning of the account into a pay wallet from the issuer's mobile application.

At block 310, the gateway encryption service may transmit the user information and the account information to a gateway lookup service (e.g., full PAN lookup service 150 of FIG. 1). The account information may include a PAN suffix (e.g., the last four digits of the sixteen digit account number), the user's name, the user's credentials (e.g., a username and password, biometric data including a fingerprint or iris scan, and/or so forth), wallet data for the pay wallet into which the user wishes to provision the account, an issuer nonce, and so forth.

At block 315, the gateway lookup service may receive PAN data for the payment source from an issuing host platform. The gateway lookup service may have transmitted the PAN suffix, the user's name, the user's credentials, the wallet data, and/or the issuer nonce to the issuing host platform requesting the PAN data. The PAN data may include the sixteen digit account number, the user's address, and/or a nickname the user may have assigned to the account.

At block 320, the gateway lookup service may provide the PAN data to the gateway encryption service. At block 325, the gateway encryption service may encrypt the PAN data to generate encrypted provision data. The gateway encryption service may use an encryption key to encrypt the data and a validation key to sign the data. The encryption key and validation key may be set with a specific token service provider for the issuer that the issuer may have provided to the gateway encryption service. In some embodiments, the encryption key and the validation key used for a token service provider is used for all issuers that use that token service provider. The gateway encryption service may user the encryption key to encrypt the PAN data. Optionally, the gateway encryption service may combine the PAN data, the user's credentials, the PAN suffix, the user's name, the wallet data, and/or the issuer nonce before encrypting with the encryption key. The gateway encryption service also signs the data with the validation key. Optionally, the gateway encryption service may further encrypt the encrypted data with the wallet certificate. The encrypted provision data is any or all of the above described data that was combined and encrypted with the encryption key and/or the wallet certificate.

At block 330, the gateway encryption service may transmit the encrypted provision data to the issuer mobile application server, which can be used to finalize the push provisioning process as described in detail with respect to FIG. 2.

FIG. 4 illustrates an embodiment of a computer system 400. A computer system 400 as illustrated in FIG. 4 may be incorporated into devices such as a personal computer, server computer, mobile device (e.g., smartphone, smart watch, tablet, and the like), point of service ("POS") terminal, and the like. FIG. 4 provides a schematic illustration of one embodiment of a computer system 400 that can perform some or all of the steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405, or may otherwise be in communication, as appropriate. The hardware elements may include one or more processors 410, including without limitation one or more general-purpose processors and/or one or more special-purpose processors such as digital signal processing chips, graphics acceleration processors, and/or the like; one or more input devices 415, which can include without limitation a mouse, a keyboard, a camera, a remote control, and/or the like; and one or more output devices 420, which can include without limitation a display device, a printer, and/or the like.

The computer system 400 may further include and/or be in communication with one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 430 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate transaction and/or other information via the communications subsystem 430. In other embodiments, a portable electronic device, may be incorporated into the computer system 400 (e.g., an electronic device), as an input device 415. In many embodiments, the computer system 400 will further comprise a working memory 435, which can include a RAM or ROM device, as described above.

The computer system 400 also can include software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 425 described above. In some cases, the storage medium might be incorporated within a computer system, such as computer system 400. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 400 to perform methods in accordance with various embodiments of the technology. According to a set of embodiments, some or all of the procedures of such methods are performed by the computer system 400 in response to processor 410 executing one or more sequences of one or more instructions, which might be incorporated into the operating system 440 and/or other code, such as an application program 445, contained in the working memory 435. Such instructions may be read into the working memory 435 from another computer-readable medium, such as one or more of the storage device(s) 425. Merely by way of example, execution of the sequences of instructions contained in the working memory 435 might cause the processor(s) 410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 and/or components thereof generally will receive signals, and the bus 405 then might carry the signals and/or the data, instructions, etc. carried by the signals to the working memory 435, from which the processor(s) 410 retrieves and executes the instructions. The instructions received by the working memory 435 may optionally be stored on a non-transitory storage device 425 either before or after execution by the processor(s) 410.

Figure 5:
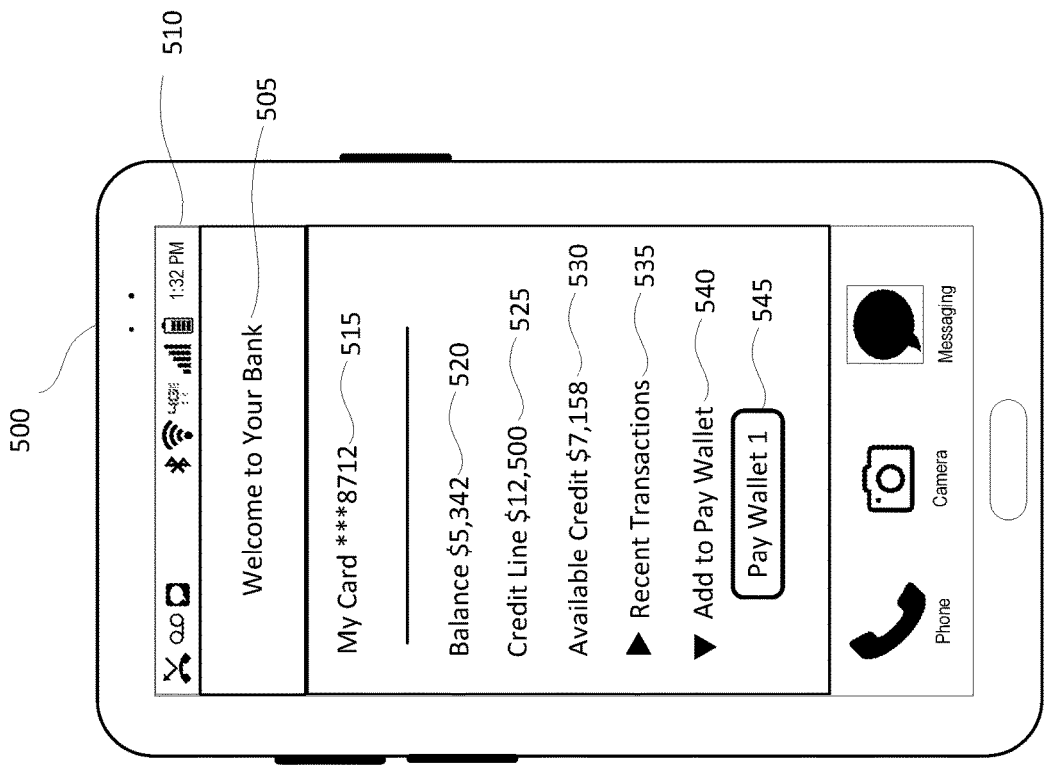
FIG. 5 illustrates an exemplary user interface for instant digital issuance of payment sources.

FIG. 5 illustrates an exemplary mobile device 500 (e.g., wallet device 105) which is displaying a user interface of the issuer mobile application (e.g., issuer mobile application 130). The user interface may be for a card issuer, which may be displayed in a banner 505, in this case "Your Bank" is the issuer. The card nickname ("My Card") and the PAN suffix data ("8712") is displayed as shown at 515. A balance 520, credit line 525, and available credit 530, for example, may be shown in the user interface. A collapsible link 535 for recent transaction may be available. Further, a collapsible link 540 for adding an account to a pay wallet may be available. Once the collapsible link 540 is selected, the button 545 for push provisioning the account, which has an associated nickname of "My Card" and a PAN suffix of 8712, into Pay Wallet 1. The button 545 may be provided as a result of the actions described in the swim diagram 200 associated with arrows 202, 204, 206, 208, 210, 212, 214, 216, 218, 220, 22, and 224. If the user selects the button 545 to initiate the push provisioning process, the actions described in swim diagram 200 beginning with arrow 226 may ensue to successfully complete the push provisioning process and make the account with PAN suffix 8712 available for use on the mobile device 500 within Pay Wallet 1.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. One or more non-transitory computer-readable media comprising computer-readable instructions stored thereon that when executed by one or more processors causes the one or more processors to perform a process for provisioning instant digital access to a user payment source using a mobile device pay wallet comprising:
   receiving, at a gateway encryption service, from an issuer mobile application server, user information for a user and account information for provisioning the user payment source;
   transmitting, by the gateway encryption service, the user information and the account information to a gateway lookup service to request primary account number data for the user payment source from an issuing host platform;
   receiving, at the gateway lookup service, from the issuing host platform, the primary account number data comprising an account number for the user payment source;
   encrypting, by the gateway encryption service, the primary account number data to generate encrypted provision data by:
      identifying a first set of encryption requirements associated with a token service provider, wherein the first set of encryption requirements include a type of encryption algorithm and a minimum length of an encryption key;
      identifying, by the gateway encryption service, an encryption key from a plurality of encryption keys stored in a database using the primary account number data, the encryption key set with token service provider information;
      identifying, by the gateway encryption service, a second set of encryption requirements for the mobile device pay wallet using wallet data from the mobile device pay wallet;
      ensuring that the encryption key complies with the combination of the first set of encryption requirements and the second set of encryption requirements; and
      applying the encryption key set by the token service provider to the primary account number data based on an encryption algorithm and a minimum length of the encryption key identified from the first set of encryption requirements;
   transmitting, by the gateway encryption service, the encrypted provision data to the issuer mobile application server.

2. The one or more non-transitory computer-readable media of claim 1,
   wherein identifying the encryption key comprises:
      identifying an issuer using the primary account number data, wherein provision requests for issuers that use the token service provider have data that is encrypted with the encryption key; and
      searching the database for the encryption key using the issuer.

3. The one or more non-transitory computer-readable media of claim 1, wherein encrypting the primary account number data further comprises:
   identifying a validation key from a plurality of validation keys using the primary account number data; and
   signing, using the validation key, the encrypted provision data.

4. The one or more non-transitory computer-readable media of claim 1, wherein the user payment source is a credit card or debit card.

5. The one or more non-transitory computer-readable media of claim 1, wherein the user information for the user and the account information for the user payment source comprise one or more of a name of the user, a digital wallet data of the user, or an issuer nonce.

6. The one or more non-transitory computer-readable media of claim 1, wherein the primary account number data comprises one or more of a sixteen-digit primary account number of the user payment source, an address of the user, or a nickname of the user payment source.

7. The one or more non-transitory computer-readable media of claim 1, wherein the one or more processors further execute computer-readable instructions for:
   receiving, at an issuer mobile application using a software development kit, a list of accounts for the user, wherein the user payment source is selected from the list of accounts.

8. The one or more non-transitory computer-readable media of claim 1, wherein the one or more processors further execute computer-readable instructions for:
   receiving, at an issuer mobile application using a software development kit, the encrypted provision data;
   generating, by the software development kit, a request to provision the user payment source in the mobile pay wallet of the user using the encrypted provision data; and
   receiving, by the software development kit, a result of the request to provision the user payment source in the mobile device pay wallet.

9. The one or more non-transitory computer-readable media of claim 1, wherein the one or more processors further execute computer-readable instructions for:
   receiving from the issuer mobile application server, an issuer nonce indicating that the user was authenticated by the issuer mobile application server;

wherein encrypting the primary account number data comprises encrypting the issuer nonce along with the primary account number data.

10. The one or more non-transitory computer-readable media of claim 9, wherein the one or more processors further execute computer-readable instructions for:
receiving, at the token service provider, the encrypted primary account number data with the issuer nonce;
decrypting, by the token service provider, the encrypted primary account number data and the issuer nonce using the encryption key;
validating, by the token service provider, a signature of the primary account number data with a validation key; and
in response to validating the signature, transmitting, by the token service provider, a provision request comprising the issuer nonce.

11. The one or more non-transitory computer-readable media of claim 1, wherein the one or more processors further execute computer-readable instructions for:
receiving, by a software development kit, an indication from an issuer mobile application to add the user payment source to the pay wallet, the indication being sent responsive to the issuer mobile application receiving the encrypted provision data from the issuer mobile application server;
transmitting, by the software development kit, the encrypted provision data to a pay wallet upon receiving the indication;
receiving, by the software development kit, a message from the pay wallet in response to transmitting the encrypted provision data to the pay wallet, the message indicating whether the user payment source was successfully provisioned to the pay wallet or not; and
transmitting, by the software development kit, the message to the issuer mobile application for displaying a notification to the user indicating whether the user payment source was provisioned or not.

12. A gateway system comprising:
one or more processors, and
one or more memories having stored thereon computer-readable instructions that, when executed by the one or more processors, cause the one or more processors to:
receive, by a gateway encryption service, from an issuer mobile application server, user information for a user and account information for a payment source of the user;
transmit, by the gateway encryption service, the user information and the account information to a gateway lookup service;
receive, at the gateway lookup service, from an issuing host platform, primary account number data comprising an account number for the payment source;
transmit, by the gateway lookup service, the primary account number data to the gateway encryption service;
encrypt, by the gateway encryption service, the primary account number data using an encryption key associated with a token service provider to generate encrypted provision data,
wherein the encrypting comprises:
identifying
a first set of encryption requirements associated with a token service provider, wherein the first set of encryption requirements include a type of encryption algorithm and a minimum length of an encryption key;
identifying, by the gateway encryption service, an encryption key from a plurality of encryption keys stored in a database using the primary account number data, the encryption key set with token service provider information;
identifying, by the gateway encryption service, a second set of encryption requirements for the mobile device pay wallet using wallet data from the mobile device pay wallet;
ensuring that the encryption key complies with the combination of the first set of encryption requirements and the second set of encryption requirements; and
applying the encryption key set by the token service provider to the primary account number data based on an encryption algorithm and a minimum length of the encryption key identified from the first set of encryption requirements; and
transmitting the encrypted provision data to the issuer mobile application server.

13. The gateway system of claim 12, wherein identifying the encryption key comprises:
identifying an issuer using the primary account number data, wherein provision requests for issuers that use the token service provider have data that is encrypted with the encryption key; and
searching the database for the encryption key using the issuer.

14. The gateway system of claim 12, wherein the user information for the user and the account information for the payment source of the user comprises one or more of a name of the user, a digital wallet data of the user, or an issuer nonce.

15. The gateway system of claim 12, wherein the primary account number data comprises one or more of a sixteen-digit primary account number of the payment source, an address of the user, or a nickname of the payment source.

16. The gateway system of claim 12, wherein for encrypting the primary account number data, the one or more processors further execute computer-readable instructions to:
identify a validation key from a plurality of validation keys using the primary account number data; and
sign, using the validation key, the encrypted provision data.

17. The gateway system of claim 12, wherein the payment source is a credit card or debit card.

18. The gateway system of claim 12, wherein the one or more processors further execute computer-readable instructions to receive a list of accounts for the user, wherein the payment source is selected from the list of accounts.

19. The gateway system of claim 12, wherein the one or more processors further execute computer-readable instructions to:
receive, at an issuer mobile application using a software development kit, the encrypted provision data;
generate, by the software development kit, a request to provision the payment source in a mobile device pay wallet of the user using the encrypted provision data; and
receive, by the software development kit, a result of the request to provision the payment source in the mobile device pay wallet.

20. The gateway system of claim 12, wherein the one or more processors further execute computer-readable instructions to:

receive from the issuer mobile application server an issuer nonce indicating that the user was authenticated by the issuer mobile application server, wherein encrypting the primary account number data comprises encrypting the issuer nonce along with the primary account number data.

21. The gateway system of claim 12, wherein the one or more processors further execute computer-readable instructions to:
- receive, by a software development kit, an indication from an issuer mobile application to add the user payment source to the pay wallet, the indication being sent responsive to the issuer mobile application receiving the encrypted provision data from the issuer mobile application server;
- transmit, by the software development kit, the encrypted provision data to a pay wallet upon receiving the indication;
- receive, by the software development kit, a message from the pay wallet in response to transmitting the encrypted provision data to the pay wallet, the message indicating whether the user payment source was successfully provisioned to the pay wallet or not; and
- transmit, by the software development kit, the message to the issuer mobile application for displaying a notification to the user indicating whether the user payment source was provisioned or not.

* * * * *